US012374209B2

(12) United States Patent
Thompson et al.

(10) Patent No.: US 12,374,209 B2
(45) Date of Patent: Jul. 29, 2025

(54) SYSTEM AND METHOD FOR PERSONAL PROTECTIVE EQUIPMENT ARTICLE

(71) Applicant: 3M INNOVATIVE PROPERTIES COMPANY, St. Paul, MN (US)

(72) Inventors: Darin K. Thompson, Huntersville, NC (US); Craig M. Parkulo, Midland, NC (US); David A. Amero, Calgary (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/007,223

(22) PCT Filed: Jul. 28, 2021

(86) PCT No.: PCT/IB2021/056866

§ 371 (c)(1),
(2) Date: Jan. 27, 2023

(87) PCT Pub. No.: WO2022/034419

PCT Pub. Date: Feb. 17, 2022

(65) Prior Publication Data

US 2023/0316888 A1 Oct. 5, 2023

Related U.S. Application Data

(60) Provisional application No. 63/065,800, filed on Aug. 14, 2020.

(51) Int. Cl.
*G08B 21/04* (2006.01)
*G08B 25/10* (2006.01)
(Continued)

(52) U.S. Cl.
CPC ......... *G08B 21/0446* (2013.01); *G08B 25/10* (2013.01); *G10L 13/02* (2013.01); *H04R 3/00* (2013.01); *H04R 2420/07* (2013.01)

(58) Field of Classification Search
CPC .... G08B 21/0446; G08B 25/10; G08B 21/02; G10L 13/02; G10L 13/00; H04R 3/00; H04R 2420/07; A62B 9/006
See application file for complete search history.

(56) References Cited

U.S. PATENT DOCUMENTS 6,121,881 A * 9/2000 Bieback ................ G08B 21/16 455/100
2007/0226310 A1* 9/2007 Shaffer ................ H04L 67/535 709/207
(Continued)

FOREIGN PATENT DOCUMENTS

DE 19859025 A1 * 6/2000 .......... G08B 25/006
WO 2017030837 2/2017

OTHER PUBLICATIONS

International Search Report for PCT Application No. PCT/IB2021/056866, mailed on Nov. 2, 2021, 3 pages.

*Primary Examiner* — Rufus C Point
(74) *Attorney, Agent, or Firm* — Johannes P. M. Kusters; Jonathan V. Sry

(57) ABSTRACT

A system for use with a personal protective equipment (PPE) article includes a memory configured to store a user identification associated with a user of the PPE article. The system further includes a safety module configured to selectively generate an alert signal based on a motion status of the user of the PPE article. The system further includes a transceiver unit configured to wirelessly transmit and receive data. The system further includes a controller communicably coupled to the memory, the safety module and the transceiver unit. The controller is configured to retrieve the user identification from the memory upon receiving the alert signal from the safety module. The controller is further configured to convert the user identification into a speech
(Continued)

data. The controller is further configured to transmit the speech data through the transceiver unit.

15 Claims, 7 Drawing Sheets

(51) Int. Cl.
*G10L 13/02* (2013.01)
*H04R 3/00* (2006.01)

(56) References Cited

U.S. PATENT DOCUMENTS

| | | | | |
|---|---|---|---|---|
| 2010/0150122 | A1* | 6/2010 | Berger .................. | H04W 4/029 370/328 |
| 2014/0081631 | A1 | 3/2014 | Zhu et al. | |
| 2017/0023369 | A1* | 1/2017 | Mohler ................ | G01C 21/206 |
| 2017/0309152 | A1* | 10/2017 | Dinkins ............... | G08B 21/043 |
| 2019/0005803 | A1 | 1/2019 | Wingfield et al. | |
| 2019/0057681 | A1 | 2/2019 | Rachakonda et al. | |
| 2019/0174208 | A1 | 6/2019 | Speicher et al. | |
| 2019/0347597 | A1 | 11/2019 | Asendorf et al. | |
| 2020/0065530 | A1 | 2/2020 | Huseth et al. | |

* cited by examiner

SYSTEM AND METHOD FOR PERSONAL PROTECTIVE EQUIPMENT ARTICLE

TECHNICAL FIELD

The present disclosure relates to a system and a method for use with a personal protective equipment (PPE) article.

BACKGROUND

Personal protective equipment (PPE) articles, such as respiratory protection devices, may be used by emergency personnel, for example, firefighters, law enforcement, first responders, healthcare professionals, paramedics, HAZMAT workers, medical personnel, or other personnel who work in hazardous or potentially hazardous environments, for example, fires, chemical environments, biological environments, nuclear environments, natural disasters, or other physical environments, for example, construction sites, agricultural sites, mining or manufacturing sites, etc.

A Personal Alert Safety System (PASS) device may commonly be used with PPE articles, such as those used by firefighters, when entering a hazardous environment (e.g., a burning building). The PASS device may typically be a battery-powered device that is carried by a user of the PPE article and generally provides a loud audible/visual alert to notify others when the user is in distress. Typically, the PASS device may be activated manually or automatically (e.g., manually by the user pressing a button, or automatically by a motion sensing device that activates the PASS device when the user has not moved for a certain amount of time).

Conventional PASS devices suffer from limited outreach in terms of the personnel/team members who may receive the PASS alert when the user is in distress. Further, the methods of receiving the PASS alert are typically limited. The audible/visual alert may be received only by those in proximity or by those who are connected using sophisticated worker-type applications that are specially designed for such environments and applications.

SUMMARY

In one aspect, a system for use with a personal protective equipment (PPE) article is described. The system includes a memory configured to store a user identification associated with a user of the PPE article. The system further includes a safety module configured to selectively generate an alert signal based on a motion status of the user of the PPE article. The system further includes a transceiver unit configured to wirelessly transmit and receive data. The system further includes a controller communicably coupled to the memory, the safety module and the transceiver unit. The controller is configured to retrieve the user identification from the memory upon receiving the alert signal from the safety module. The controller is further configured to convert the user identification into a speech data. The controller is further configured to transmit the speech data through the transceiver unit.

In another aspect, a personal protective equipment (PPE) system is described. The PPE system includes a memory configured to store a user identification associated with a user of the PPE system. The PPE system further includes a safety module configured to selectively generate an alert signal based on a motion status of the user of the PPE system. The PPE system further includes a transceiver unit configured to wirelessly transmit and receive data. The PPE system further includes a protection device including a controller communicably coupled to the memory, the safety module and the transceiver unit. The controller is configured to retrieve the user identification from the memory upon receiving the alert signal from the safety module. The controller is further configured to convert the user identification into a speech data. The controller is further configured to transmit the speech data through the transceiver unit.

In a further aspect, a method for use with a personal protective equipment (PPE) article is described. The method includes receiving an alert signal from a safety module based a motion status of a user of the PPE article. The method further includes retrieving, via a controller, a user identification associated with the user of the PPE article from a memory. The method further includes converting, via the controller, the user identification into a speech data. The method further includes transmitting the speech data through a transceiver unit. The transceiver unit is configured to wirelessly transmit and receive data.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

According to aspects of this disclosure, a system for use with a personal protective equipment (PPE) article includes a memory configured to store a user identification associated with a user of the PPE article. The system further includes a safety module configured to selectively generate an alert signal based on a motion status of the user of the PPE article. The system further includes a transceiver unit configured to wirelessly transmit and receive data. The system further includes a controller communicably coupled to the memory, the safety module and the transceiver unit. The controller is configured to retrieve the user identification from the memory upon receiving the alert signal from the safety module. The controller is further configured to convert the user identification into a speech data and transmit the speech data through the transceiver unit.

The transceiver unit may transmit the speech data comprising the user identification to others that may not necessarily be close to the user of the PPE article. For example, the transceiver unit may transmit the speech data to a central base station or to other team members. This would allow a greater outreach for the alert signal indicating that the user is in distress and thereby improving the chances of rescue and consequently saving life of the user. Further, the speech data may allow easy identification of the user who is in distress.

Figure 1:
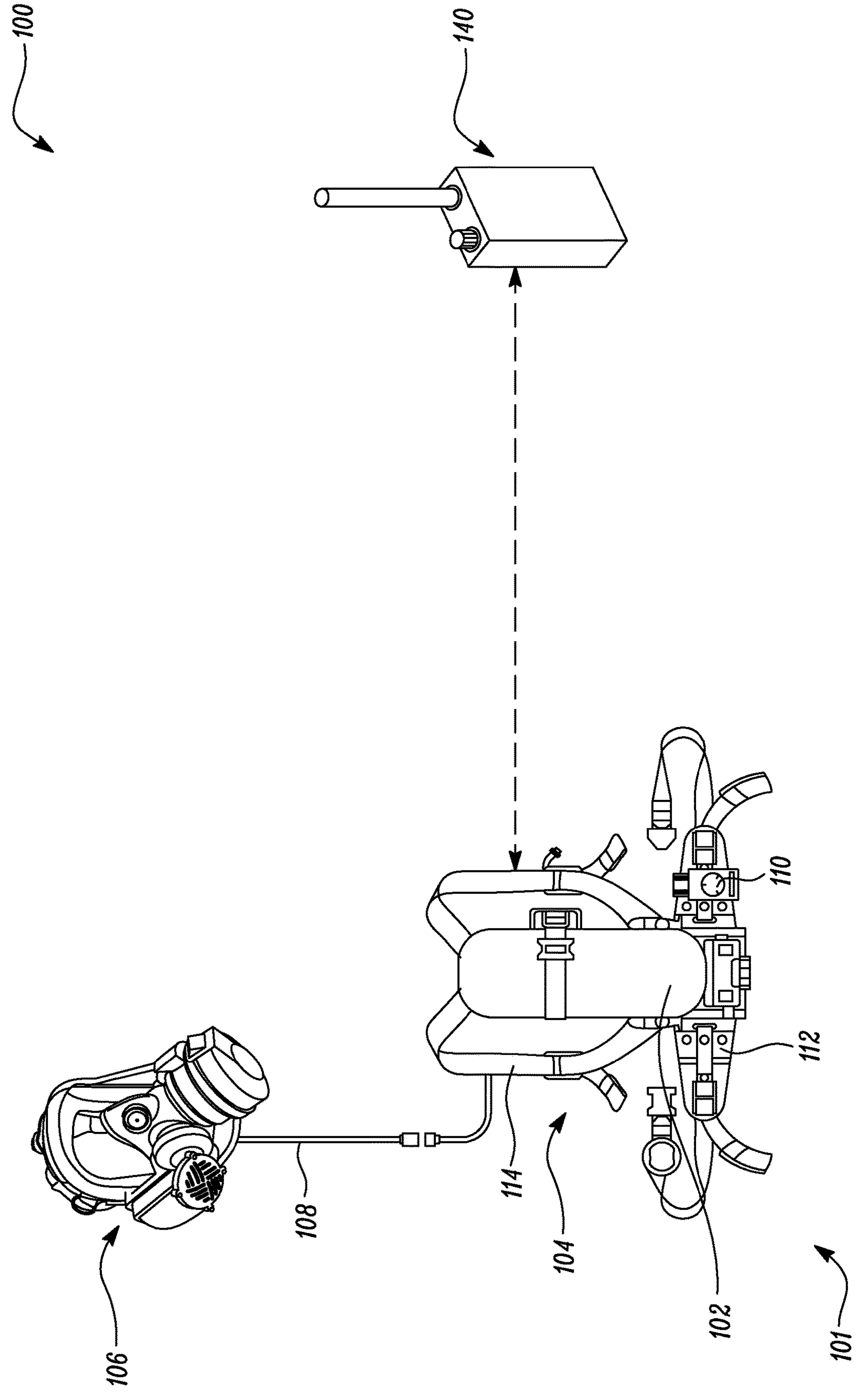
FIG. 1 illustrates a schematic perspective view of an example of a personal protective equipment (PPE) article, in accordance with techniques of this disclosure.

FIG. 1 illustrates a schematic view of an example system 100 for use with a personal protective equipment (PPE) article 101. The PPE article 101 may be used to protect a user from harm or injury from a variety of factors in an environment. For example, the PPE article 101 may be utilized by firefighters to protect against fires or extreme temperature conditions. As used herein, the term "protective equipment" may include any type of equipment or clothing that may be used to protect the user from hazardous or potentially hazardous conditions. In some examples, the user may utilize the PPE article 101 while engaging in tasks or activities within the environment.

Examples of PPE article 101 may include, but are not limited to, respiratory protection equipment (including disposable respirators, reusable respirators, powered air purifying respirators, self-contained breathing apparatus and supplied air respirators), facemasks, oxygen tanks, air bottles, protective eyewear, such as visors, goggles, filters or shields (any of which may include augmented reality functionality), protective headwear, such as hard hats, hoods or helmets, hearing protection (including ear plugs and ear muffs), protective shoes, protective gloves, other protective clothing, such as coveralls, aprons, coat, vest, suits, boots and/or gloves, protective articles, such as sensors, safety tools, detectors, global positioning devices, mining cap lamps, fall protection harnesses, exoskeletons, self-retracting lifelines, heating and cooling 20) systems, gas detectors, and any other suitable gear configured to protect users from injury. The PPE article 101 may also include any other type of clothing or device/equipment that may be worn or used by users to protect against fire, extreme temperatures, reduced oxygen levels, explosions, reduced atmospheric pressure, radioactive and/or biologically harmful materials.

In some examples, the PPE article 101 may be used by emergency personnel, for example, firefighters, law enforcement, first responders, healthcare professionals, paramedics, HAZMAT workers, security personnel, or other personnel who work in potentially hazardous conditions, for example, chemical environments, biological environments, nuclear environments, fires, or other physical environments, for example, construction sites, agricultural sites, mining or manufacturing sites.

In the example of FIG. 1, the PPE article 101 is illustrated as a breathing apparatus. In some examples, the PPE article 101 may include at least one of a self-contained breathing apparatus (SCBA), a powered air-purifying respirator (PAPR), a non-powered air purifying respirator (APR) and a full-face respirator. However, it should be understood that the PPE article 101 may be of any type as mentioned above. In some examples, the PPE article 101 may be a hybrid breathing system which may be selectively operable in an SCBA mode in which breathable air/gas may be provided by one or more tanks or cylinders, a PAPR mode of operation in which filtered ambient air may be drawn with the assistance of a blower through one or more air filters or purifiers and delivered to the user, and an APR mode of operation in which the air is drawn through one or more air filters or purifiers via a user's negative inhalation pressure.

The PPE article 101 includes one or more high-pressure tanks 102 secured to a backpack 104. In some examples, the high-pressure tank 102 may store breathable air at a certain elevated pressure. The PPE article 101 further includes a facepiece 106 intended to be worn on a head of the user of the PPE article 101. The facepiece 106 may be connected to the high-pressure tank 102 through a fluid line 108. In some examples, the fluid line 108 may selectively provide the breathable air to the facepiece 106 from the high-pressure tank 102. For example, the high-pressure tank 102 may provide the user with oxygen or air for breathing in a hazardous and/or contaminated environment. In some examples, the breathable air may be reduced to a designated pressure before it is delivered to the facepiece 106 through the fluid line 108. The backpack 104 includes a belt 112 and shoulder straps 114 such that the user may carry the PPE article 101 in any working environment.

The PPE article 101 further includes a safety module 110 that may be mounted on the backpack 104. The safety module 110 may include a motion sensor (not shown) or any instrument which may detect motion of the PPE article 101 and the user. Examples of motion sensors may include, but not limited to, mercury switch, ball sensor, 2-axis accelerometer, 3-axis accelerometer, and/or the like. Further, the safety module 110 may include multiple motion sensors. In some examples, the safety module 110 may further include an audio device operable to generate an alert signal for others if the user is in distress. For example, the audio device may generate a sound to alert others that the user (e.g., a firefighter) is in distress and needs to be 25 evacuated. In should be understood that any other form of alert may be generated to notify others. In some cases, the safety module 110 may additionally include a visual device (for example, one or more lights) to generate a visual alert in case the user is in distress.

In the illustrated example of FIG. 1, the safety module 110 is located on the belt 112. However, the safety module 110 may be located anywhere on the user. Accurate motion sensing may depend on the placement of the motion sensor and the mounting method of the motion sensor. For example, the motion sensor may be located near the hip (or lower back) region or chest (or shoulder) region of the user. Motion detected from the user while working (and wearing the safety module 110) may vary depending on the use case scenario and the location of the motion sensor. The safety module 110 may typically be attached to the PPE article 101 to allow for easy access by the user, which may be necessary when the safety module 110 needs to be manually activated. In other examples, the safety module 110 may be activated automatically by the motion sensor when it is detected that the user has not moved in a certain amount of time. Further, the user may manually deactivate the safety module 110, for example, in case of false alarm or when the distress situation has been averted.

The system 100 may further include a communication system that allows the user to communicate with a central base station and/or other team members (e.g., other firefighters). For example, the communication system may include a transceiver unit 140 that facilitates radio communication. In some examples, the transceiver unit 140 may be a two-way radio powered by a battery (or other similar power source). In some examples, the transceiver unit 140 may include various components, such as a microphone, a speaker, and a push-to-talk (PTT) switch, mounted on or otherwise accessible to the transceiver unit 140. In some examples, the transceiver unit 140 may include a user interface to provide emergency alerts.

The transceiver unit 140 may optionally be coupled with a remote accessory (e.g., a remote speaker microphone, a headset, etc.) for providing remote radio functions. For example, the transceiver unit 140 may typically be worn on a belt (e.g., the belt 112) of the user while the remote accessory may typically be worn near a shoulder of the user for easy access to remote functions. Such remote radio functions may include, but are not limited to, push-to-talk (PTT), speaker, and microphone functions. In some examples, the transceiver unit 140 or the remote accessory may include one or more emergency buttons that may be activated to trigger a distress signal. For example, the transceiver unit 140 may transmit a notification to the central base station or to the other team members when the one or more emergency buttons is depressed.

Figure 2:
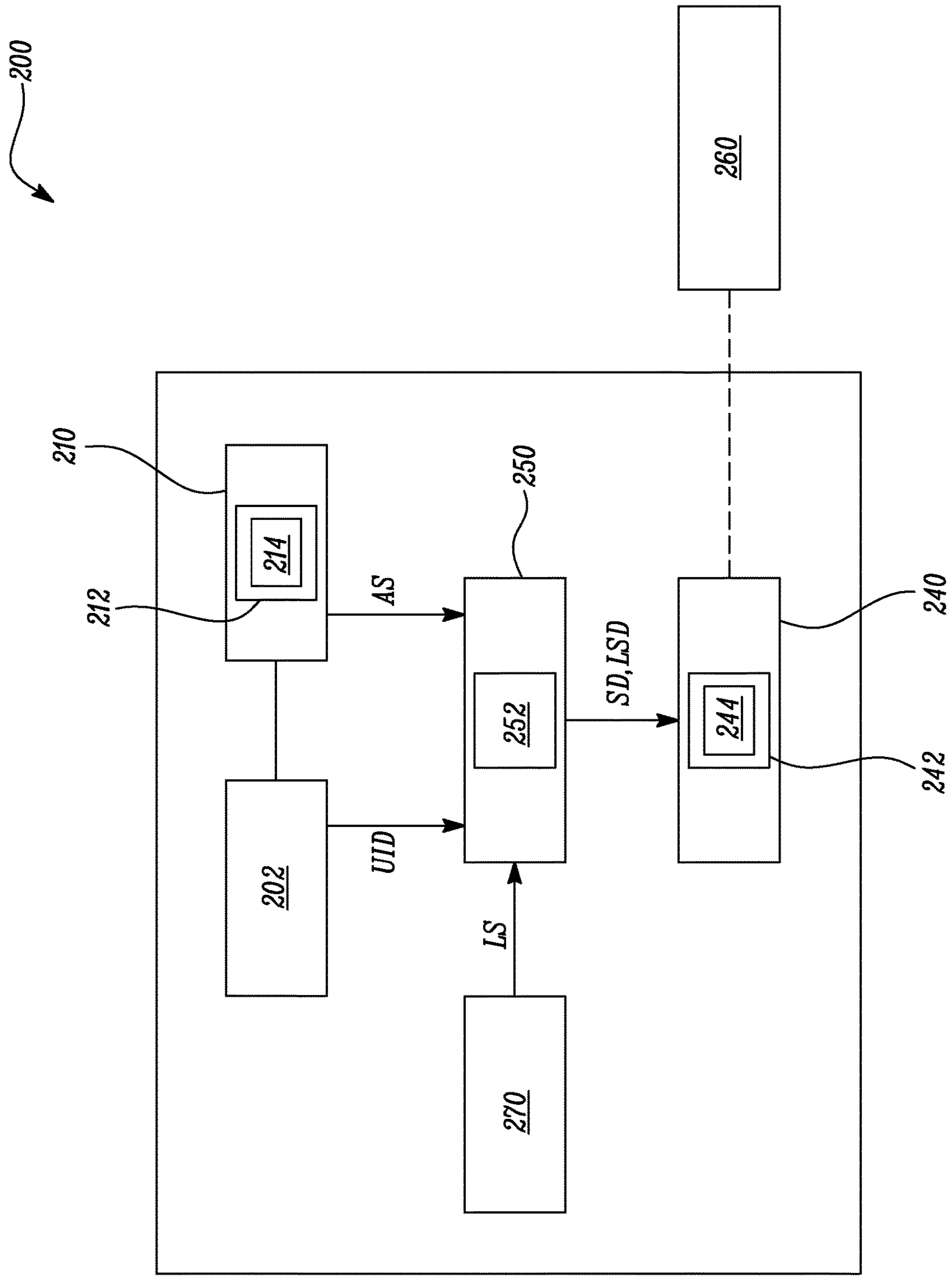
FIG. 2 is a block diagram illustrating an exemplary system for use with a personal protective equipment (PPE) article, in accordance with techniques of this disclosure.

FIG. 2 is a block diagram illustrating an exemplary system 200 for use with a personal protective equipment (PPE) article. The system 200 may be similar to the system 100 of FIG. 1. Referring to FIGS. 1 and 2, the system 200 includes a memory 202 configured to store a user identification UID associated with a user of the PPE article 101. Alternatively, or additionally, the user identification UID may be stored in a radio frequency identification (RFID) tag associated with the PPE article 101 that may be read by the system 200.

In some examples, the memory 202 may be a main memory, a static memory, or a dynamic memory. The memory 202 may include, but may not limited to, computer readable storage media, such as various types of volatile and non-volatile storage media, including, but not limited to, random access memory, read-only memory, programmable read-only memory, electrically programmable read-only memory, electrically erasable read-only memory, flash memory, magnetic tape or disk, optical media, solid-state memory array, and/or the like. In some examples, the solid-state memory array may include flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), or other discrete NVM (non-volatile memory) chips. Further, the memory 202 may include multiple memories of the type described above.

In some examples, the user identification UID may correspond to at least one of a name and a unique identification associated with the user of the PPE article 101. In some examples, the user identification UID may be a device identification associated with the PPE article 101. The data associated with the user identification UID may be stored in the memory 202 in any format, including text. In some examples, the data format may include a series of fields, each of which may include one or more bits or bytes depending upon the amount of data bits needed to convey the associated type of information. For example, each of the fields may be one byte in length.

The system 200 further includes a safety module 210 (e.g., the safety module 110) configured to selectively generate an alert signal AS based on a motion status of the user of the PPE article 101. In some examples, the safety module 210 may include a personal alert safety system (PASS) 212. Typically, a PASS is a battery-powered device that may be carried with the user and will sound a loud audible alert to notify others if the user is in distress. The PASS 212 may typically include a motion sensor 214 that detects if the user of the PPE article 101 is motionless (motion status) for a predetermined period of time and generates the alert signal AS (or distress signal) to notify the central base station or other team members. Further, the PASS 212 may also include other sensors such as air pressure sensor for detecting an amount of air remaining in a tank (e.g., the high-pressure tank 102) associated with the PPE article 101, ambient temperature sensor, altitude sensor, etc.

The system 200 further includes a transceiver unit 240 configured to wirelessly transmit and receive data. In some examples, the transceiver unit 240 may include one or more features such as a microprocessor, a speaker, a microphone, one or more battery modules, etc. The transceiver unit 240 may allow the user to communicate with the central base station and/or the other team members. In some examples, the transceiver unit 240 may include a land mobile radio (LMR) system. LMR systems are generally deployed by organizations requiring instant communication between geographically dispersed and mobile personnel. LMR systems may be configured to provide radio communications between one or more sites and subscriber radio units in the field. The subscriber radio unit may be a mobile unit or a portable unit. LMR systems may include two radio units communicating between themselves over preset channels, or they may include hundreds of radio units and multiple sites.

In some examples, the transceiver unit 240 may include a two-way radio 242, which may be portable, e.g., hand-held two-way radio. In some examples, the transceiver unit 240 may be a customized two-way radio with specialized software intended for specific users, for example, firefighters, law enforcement, etc. In some examples, the transceiver unit 240 may be configured to transmit and receive audio signals, e.g., as digital or analog modulated RF signals. For example, the transceiver unit 240 may include an RF transceiver circuit coupled to an audio circuit which may include an amplifier, a microphone, an audio speaker, a volume control, and so forth. Further, the transceiver unit 240 may include a manual and/or automatic frequency tuner for tuning to a desired frequency channel.

In some examples, the two-way radio 242 may include a push-to-talk (PTT) switch 244. In some examples, the PTT switch 244 may activate a microphone input to the two-way radio 242. For example, when the PTT switch 244 is activated, the microphone input to the two-way radio 242 is activated, allowing a voice of the user of the PPE article 101 to be transmitted through the two-way radio 242. The two-way radio 242 may typically operate in a reception mode when the two-way radio 242 only receives RF signals. In some examples, the PTT switch 244 may allow conversion of the reception mode to a transmit mode when the user may be able to transmit RF signals when desired. In some examples, the PTT switch 244 may be activated by the user whenever an audio needs to be transmitted through the two-way radio 242. Alternatively, the PTT switch 244 may also be activated automatically.

The system 200 further includes a controller 250 communicably coupled to the memory 202, the safety module 210 and the transceiver unit 240. In some examples, the controller 250 may be embodied in a number of different ways. For example, the controller 250 may be embodied as various processing means, such as one or more of a microprocessor or other processing elements, a coprocessor, or various other computing or processing devices including integrated circuits such as, for example, an ASIC (application specific integrated circuit), an FPGA (field programmable gate array), or the like. In some examples, the controller 250 may be configured to execute instructions stored in a memory or otherwise accessible to the controller 250.

As such, whether configured by hardware or by a combination of hardware and software, the controller 250 may represent an entity (e.g., physically embodied in circuitry—in the form of processing circuitry) capable of performing operations according to some embodiments while configured accordingly. Thus, for example, when the controller 250 is embodied as an ASIC, FPGA, or the like, the controller 250 may have specifically configured hardware for conducting the operations described herein. Alternatively, as another example, when the controller 250 is embodied as an executor of software instructions, the instructions may specifically configure the controller 250 to perform the operations described herein. In some examples, the controller 250 may also include a memory, such as a cache or random-access memory. Alternatively, or in addition, the memory may be separate from the controller 250, such as a system memory, or any other memory.

In some embodiments, the controller 250 may be embodied as a device separate from the memory 202, the safety module 210 and the transceiver unit 240. In some embodiments, the controller 250 may be disposed in the safety module 210. In some cases, the controller 250 may be disposed in or associated with the PASS 212. In some other embodiments, the memory 202, the safety module 210 and the controller 250 may be disposed in a common housing (not shown).

The controller 250 is configured to retrieve the user identification UID from the memory 202 upon receiving the alert signal AS from the safety module 210. The safety module 210 may generate the alert signal AS when it is determined that the user of the PPE article 101 is motionless for a predetermined period of time. The controller 250 is further configured to convert the user identification UID into a speech data SD. For example, the controller 250 may retrieve the user identification UID stored in the form of text and converts the user identification UID into the speech data SD.

In some examples, the controller 250 may further be configured to convert the user identification UID into the speech data SD using a text-to-speech converter 252. For example, the text-to-speech converter 252 may convert a text into a synthesized speech. In some examples, the text-to-speech converter 252 may proceed through several steps to convert the text into the synthesized speech. For example, the text-to-speech converter 252 may first include a text normalization procedure for processing stored text into a standardized format. Next, the text-to-speech converter 252 may perform linguistic processing, such as syntactic analysis, word pronunciation, and prosodic prediction including phrasing and accentuation. Next, the text-to-speech converter 252 may perform a prosody generation procedure, which involves translation between the symbolic text representation to numerical values (digitized speech) of a fundamental frequency, duration, and amplitude. Thereafter, the speech may be synthesized using a speech database or template comprising concatenation of a small set of controlled units, such as diphones. Increasing the size and complexity of the speech template may provide improved speech synthesis. It should be understood that the above steps are incorporated by way of example only and the data processing involved within the text-to-speech converter 252 may vary based on application requirements.

In some examples, the text-to-speech converter 252 may rely either on replaying pre-recorded voices relating to the words to be converted into speech by the text-to-speech converter 252, or by building full words from sub-elements of pronunciation known as phonemes. Generally, phonemes are the basic units of speech sound, and may represent the smallest phonetic units in a language that are capable of expressing a difference in meaning. The text-to-speech converter 252 may utilize sets of rules to generate successions of phonemes from the spellings of words to be converted into speech.

The controller 250 is further configured to transmit the speech data SD through the transceiver unit 240. For example, the transceiver unit 240 may transmit the synthesized speech (speech data SD) through the RF signals. This may allow a wider outreach for the alert signal AS as compared to localized audio/video alarms. In some examples, the controller 250 may be wirelessly coupled to the transceiver unit 240. For example, the controller 250 may communicate with the transceiver unit 240 via a wireless protocol, such as Bluetooth®, Wi-Fi, ZigBee, infrared, wireless universal serial bus (USB), near-field communication (NFC), RFID protocols, or generally any other RF protocol. Alternatively, or additionally, the controller 250 may be directly connected to the transceiver unit 240 through a data line.

In some examples, the transceiver unit 240 may include the two-way radio 242 that allows transmission of the speech data SD through a communication channel. The two-way radio 242 may operate in either duplex or half-duplex modes. The duplex mode may be similar to a telephone system where the receiving and transmitting paths are both open and both parties can speak to each other simultaneously. In the half-duplex mode, the transceiver unit 240 may allow data transmission only when the PPT switch 244 is activated.

In some examples, the two-way radio 242 may include the PTT switch 244 such that the two-way radio 242 may be configured to wirelessly transmit data upon activation of the PTT switch 244. In some examples, the controller 250 may be further configured to activate the PTT switch 244 before transmitting the speech data SD through the communication channel. For example, the controller 250 may activate the PPT switch 244 automatically after conversion of the user identification UID into the speech data SD. Usually, a certain amount of time may be required after activation of the PTT switch 244 before the communication channel is free and available for data transmission from the transceiver unit 240.

In some examples, the controller 250 may further be configured to transmit the speech data SD continuously for a predetermined period of time T1. In some examples, the predetermined period of time T1 may extend until the safety module 210 may be reset through movement of the user and/or manually reset (e.g., by other team members or rescue personnel, etc.). In some examples, the controller 250 may further be configured to transmit the speech data SD intermittently for a predetermined period of time T2. For example, the controller 250 may transmit the speech data SD repeatedly with a gap of certain period of time. The predetermined period of time T2 may extend till the safety module 210 may be manually deactivated.

In some examples, the transceiver unit 240 may further be configured to wirelessly transmit the speech data SD to an external device 260 through the communication channel. In some examples, the external device 260 may be the central base station or another two-way radio or a communication network. In some examples, the transceiver unit 240 may include one or more wired or wireless communication interfaces for communication with the external device 260. In some examples, the communication interface may represent one or more networks and/or direct connections.

In some examples, the transceiver unit 240 may communicate with the external device 260 through a communication network. In some examples, the communication network may include one or more of a wireless network, a wired network, a local area network (LAN), a metropolitan area network (MAN), a wide area network (WAN), a wireless personal area network (WPAN), WiMax networks, a direct connection such as through a Universal Serial Bus (USB) port, and/or the like, and may include a set of interconnected networks that make up the Internet. In some examples, the wireless network may include, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc. In some examples, the communication network may include a circuit-switched voice network, a packet-switched data network, or any other network capable for carrying electronic communication. For example, the communication network May include networks based on the Internet protocol (IP) or asynchronous transfer mode (ATM), etc.

Examples of the communication network may further include, but are not limited to, a personal area network (PAN), a storage area network (SAN), a home area network (HAN), a campus area network (CAN), an enterprise private network (EPN), Internet, a global area network (GAN), and so forth. Examples are intended to include or otherwise cover any type of network, including known, related art, and/or later developed technologies to connect the transceiver unit 240 with the external device 260.

In some examples, the system 200 may further include a location device 270 configured to generate a location signal LS indicative of a location of the user of the PPE article 101. In some examples, the location device 270 may include a global positioning system (GPS) receiver configured to detect location (positional information) of the user of the PPE article 101. In some examples, the location of the user may include geographical coordinates.

In some examples, the controller 250 may further be configured to receive the location signal LS from the location device 270 upon receiving the alert signal AS from the safety module 210. The controller 250 may further be configured to convert the location of the user into a location speech data LSD and transmit the location speech data LSD through the transceiver unit 240. In some examples, the controller 250 may first convert the location of the user into text (e.g., area name, building, etc.) and then into the location speech data LSD. In some examples, the location speech data LSD may be processed in a similar manner as the speech data SD by the text-to-speech converter 252. The location speech data LSD may then be transmitted through the transceiver unit 240 such that the other team members or the central base station may determine the location of the user of the PPE article 101.

In some examples, the controller 250 may further be configured to merge the location speech data LSD with the speech data SD corresponding to the user identification UID. For example, the transceiver unit 240 may combine the speech data SD (e.g., the name or the unique identification, etc.) with the location speech data LSD (e.g., area, building, etc.) and transmit the combined speech data through the transceiver unit 240.

Figure 3:
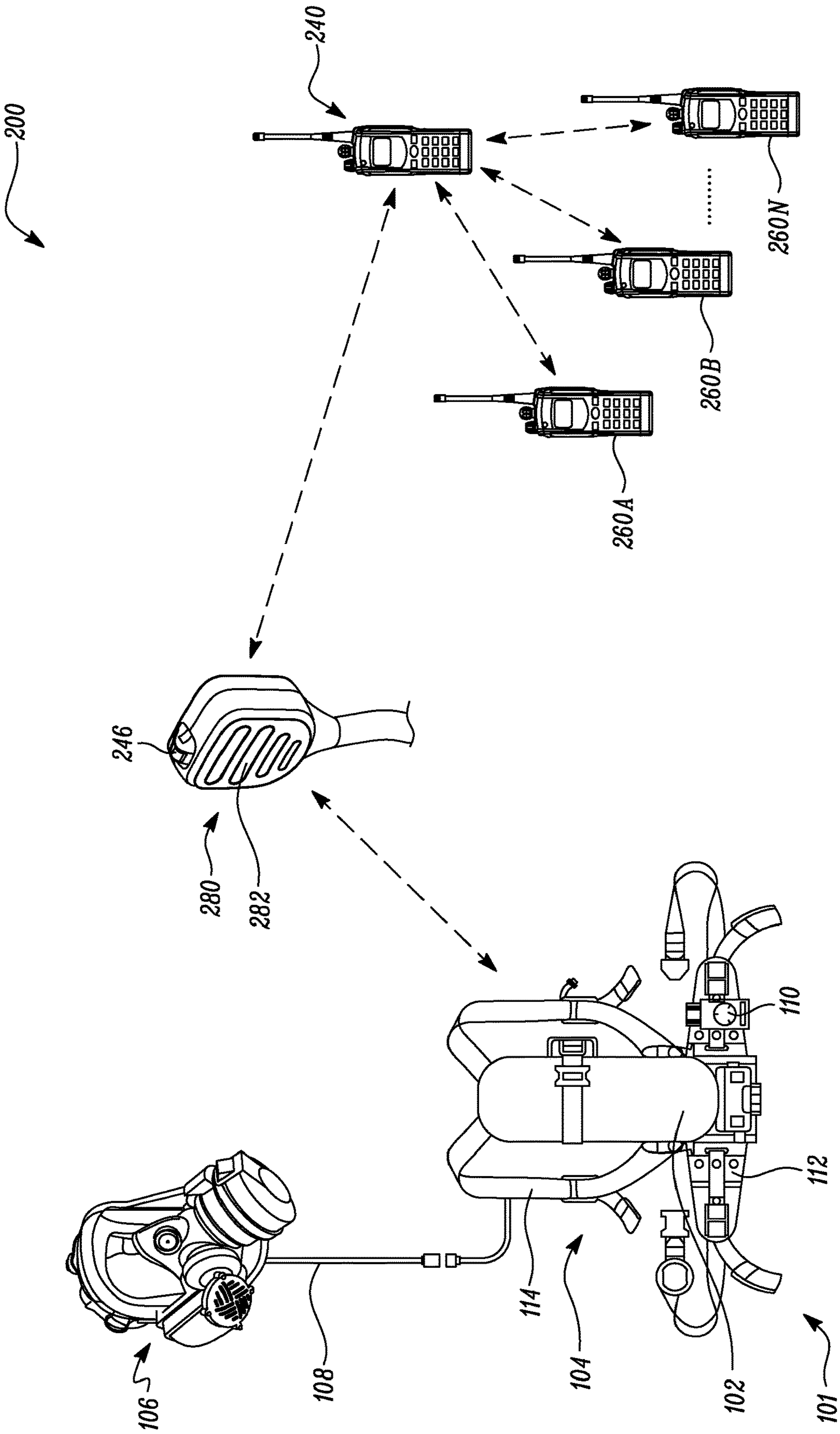
FIG. 3 illustrates a schematic view of an example of the system of FIG. 2, in accordance with techniques of this disclosure.

FIG. 3 illustrates a schematic view of an example of the system 200. Referring now to FIGS. 1-3, the system 200 includes the PPE article 101 and the transceiver unit 240. The system 200 may further include a remote speaker microphone (RSM) 280 communicably coupled to the controller 250 and the transceiver unit 240. The RSM 280 may provide remote radio functions, such as speaker and microphone functions. In some examples, the transceiver unit 240 may be worn on a belt (e.g., the belt 112) of the user of the PPE article 101 while the RSM 280 may typically be worn near a shoulder of the user for easy access to remote functions. In some examples, the RSM 280 may be implemented as a headset intended to be worn close to the ears of the user. A Push-to-talk (PTT) switch 246 may be provided on the RSM 280. The PTT switch 246 may be similar to the PTT switch 244 while providing remote functionality. In some examples, the RSM 280 may include an in-built RSM controller for controlling the remote radio functions. The RSM 280 may be wirelessly coupled to the transceiver unit 240 or through a cable (not shown). Further, the RSM 280 may include a speaker grill 282 and a microphone (not shown).

The RSM 280 may be configured to receive the speech data SD (and/or the location speech data LSD) from the controller 250 and transmit the speech data SD through the transceiver unit 240. In some examples, the RSM 280 may communicate with the controller 250 via a wireless protocol, such as Bluetooth®, Wi-Fi, ZigBee, infrared, wireless universal serial bus (USB), near-field communication (NFC), RFID protocols, or generally any other RF protocol. Alternatively, or additionally, the RSM 280 may be directly connected to the controller 250 through a data line (not shown). The transceiver unit 240 may wirelessly transmit the speech data SD (and/or the location speech data LSD) to external devices 260A-260N (collectively, the external device 260) through the communication channel. Alternatively, or additionally, the external device 260 may be the central base station.

Figure 4:
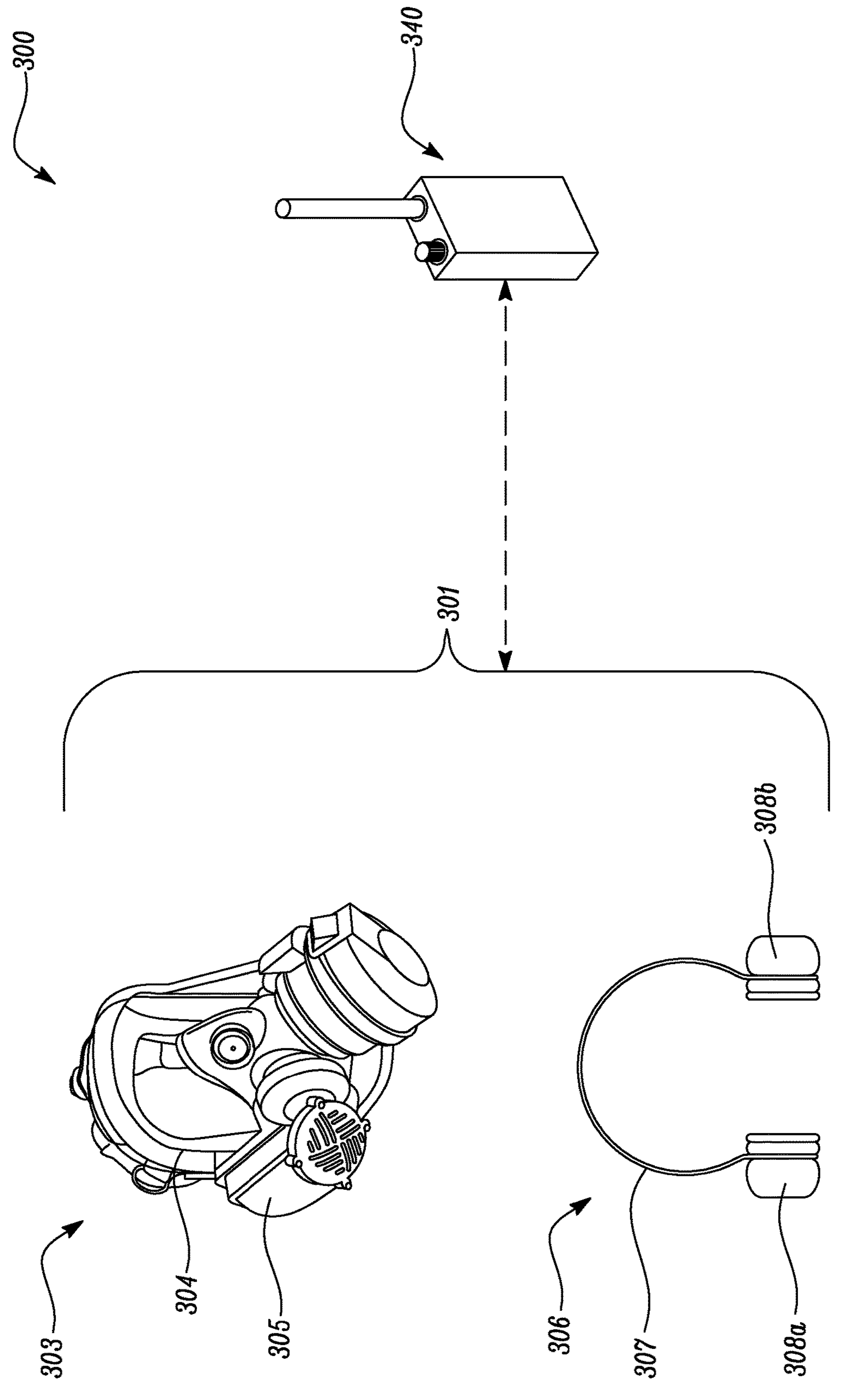
FIG. 4 illustrates a schematic view of an exemplary PPE system, in accordance with techniques of this disclosure.

FIG. 4 illustrates a schematic view of an exemplary PPE system 300. The PPE system 300 includes a protection device 301 communicably coupled to a transceiver unit 340. In some examples, the protection device 301 may include at least one of a breathing device 303 and a hearing protective device 306. In some examples, the breathing device 303 may include a facepiece 304. In some examples, the facepiece 304 may include at least one respirator element (e.g., filter or purifier) for purifying ambient air via a user's negative inhalation pressure. In some examples, the facepiece 304 may include a self-contained communication system 305 including components, such as, but not limited to, microphones, speakers, amplifiers, radios, etc. for providing two-way communication with the other team members or the central base station and/or for providing one-way communication (e.g., amplifying the user's voice, transmitting and/or broadcasting the user's voice to another location, and/or the like). In some examples, certain components such as microphones, speakers, etc. may be mounted within the facepiece 304.

In some examples, the hearing protective device 306 may include a headpiece 307 in the form of a headband and two earmuffs 308*a*, 308*b* affixed to the headpiece 307 at respective ends of the headpiece 307. In some examples, the headpiece 307 may resiliently hold the earmuffs 308*a*, 308*b* against a user's ears. The earmuffs 308*a*, 308*b* may include an ear cup and an annular cushion attached to the ear cup. It should be understood that the protection device 301, as illustrated in FIG. 3, are shown by way of example only and the protection device 301 may include any type of PPE article as mentioned earlier.

Figure 5:
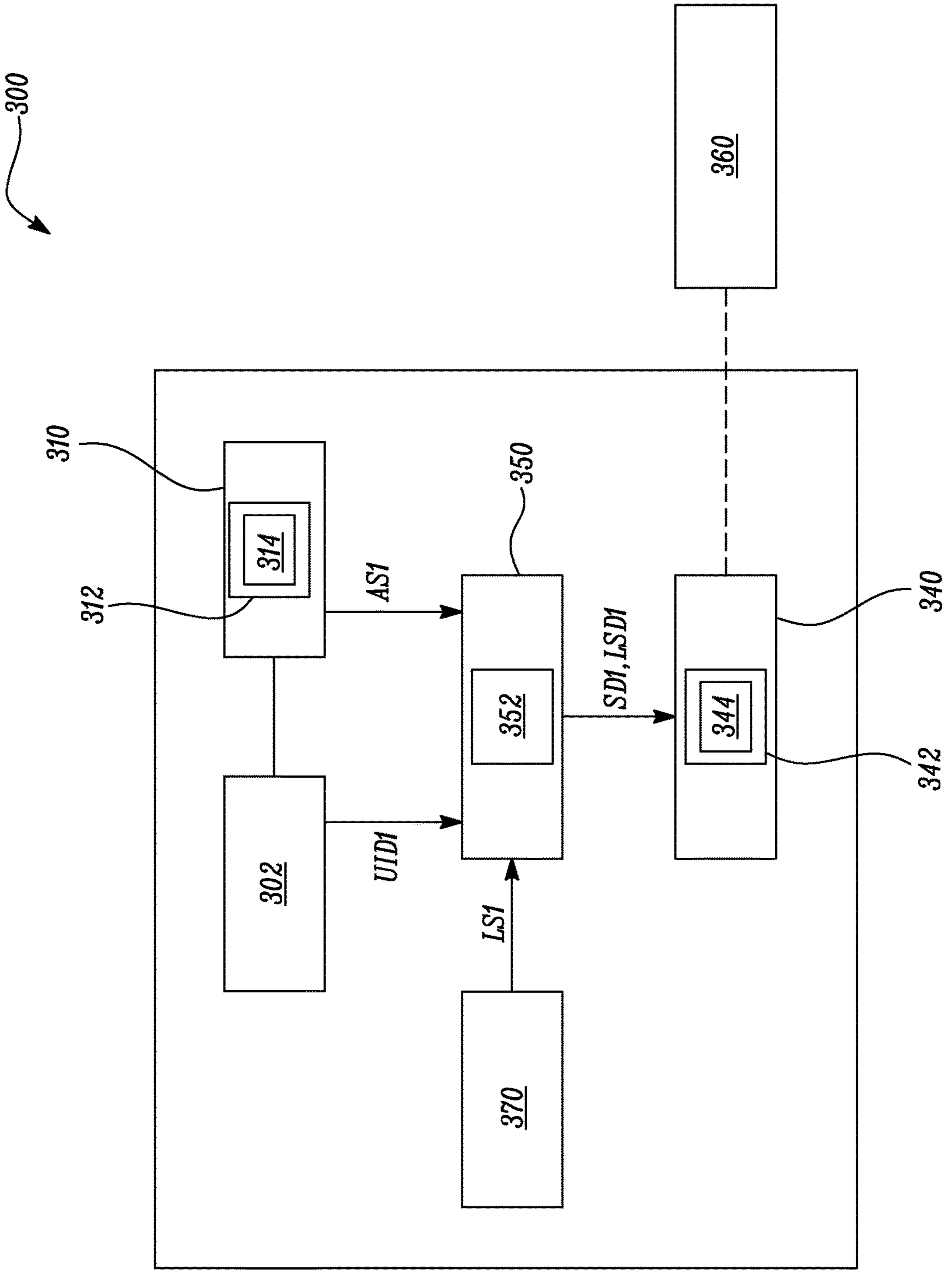
FIG. 5 is a block diagram illustrating an example of the PPE system of FIG. 4, in accordance with techniques of this disclosure.

FIG. 5 is a block diagram illustrating an example of the PPE system 300. The PPE system 300 includes a memory 302 (e.g., equivalent to the memory 202 of FIG. 2) configured to store a user identification UID1 associated with the user of the PPE system 300. In some examples, the user identification UID1 corresponds to at least one of a name and a unique identification associated with the user. Referring now to FIGS. 4 and 5, the PPE system 300 further includes a safety module 310 (e.g., equivalent to the safety module 210 of FIG. 2) configured to selectively generate an alert signal AS1 based on a motion status of the user of the PPE system 300. In some examples, the memory 302 and/or the safety module 310 may be disposed on the protection device 301. In some examples, the safety module 310 may include a personal alert safety system (PASS) 312. The PASS 312 may include a motion sensor 314 that detects if the user of the PPE system 300 is motionless (motion status) for a predetermined period of time and generates the alert signal AS1 to notify the central base station or the other team members.

The PPE system 300 further includes the transceiver unit 340 (e.g., equivalent to the transceiver 240 of FIG. 2) configured to wirelessly transmit and receive data. The transceiver unit 340 may allow the user to communicate with the central base station and/or the team members. In some examples, the transceiver unit 340 may include a land mobile radio (LMR) system. LMR systems may be configured to provide radio communications between one or more sites and subscriber radio units in the field. In some examples, the transceiver unit 340 may include a two-way radio 342, which may be portable, e.g., hand-held two-way radio. In some examples, the transceiver unit 340 may be configured to transmit and receive audio signals, e.g., as digital or analog modulated RF signals.

The PPE system 300 further includes the protection device 301 including a controller 350 (e.g., equivalent to the controller 250 of FIG. 2) communicably coupled to the memory 302, the safety module 310 and the transceiver unit 340. The controller 350 is configured to retrieve the user identification UID1 from the memory 302 upon receiving the alert signal AS1 from the safety module 310. The safety module 310 may generate the alert signal AS1 upon determining that the user of the PPE system 300 is motionless for a predetermined period of time. The controller 350 is further configured to convert the user identification UID1 into a speech data SD1. In some examples, the controller 350 may further be configured to convert the user identification UID1 into the speech data SD1 using a text-to-speech converter 352 (e.g., equivalent to the text-to-speech converter 252 of FIG. 2). For example, the controller 350 may retrieve the user identification UID1 stored in the form of text and converts the user identification UID1 into the speech data SD1.

The controller 350 is further configured to transmit the speech data SD1 through the transceiver unit 340. In some examples, the controller 350 may be wirelessly coupled to the transceiver unit 340. For example, the controller 350 may communicate with the transceiver unit 340 via a wireless protocol, such as Bluetooth®, Wi-Fi, ZigBee, infrared, wireless universal serial bus (USB), near-field communication (NFC), RFID protocols, or generally any other RF protocol. Alternatively, or additionally, the controller 350 may be directly connected to the transceiver unit 340 through a data line.

In some examples, the transceiver unit 340 may include the two-way radio 342 that allows transmission of the speech data SD1 through a communication channel. In some examples, the two-way radio 342 may include a push-to-talk (PTT) switch 344 (e.g., equivalent to the PTT switch 244 of FIG. 2) such that the two-way radio 342 may be configured to wirelessly transmit data upon activation of the PTT switch 344. In some examples, the PTT switch 344 may activate a microphone input to the two-way radio 342. For example, when the PTT switch 344 is activated, the microphone input to the two-way radio 342 is activated, thereby allowing a voice of the user of the PPE system 300 to be transmitted through the two-way radio 342. The two-way radio 342 may typically operate in a reception mode when the two-way radio 342 only receives RF signals. In some examples, the PTT switch 344 may allow conversion of the reception mode to a transmit mode when the user may be able to transmit voice in the form of RF signals. In some examples, the controller 350 may further be configured to activate the PTT switch 344 before transmitting the speech data SD1 through the communication channel.

In some examples, the controller 350 may further be configured to transmit the speech data SD1 continuously for a predetermined period of time T3. In some examples, the predetermined period of time T3 may extend till the safety module 310 may be reset through movement of the user and/or manually reset (e.g., by other team member or rescue personnel, etc.). In some examples, the controller 350 may further be configured to transmit the speech data SD1 intermittently for a predetermined period of time T4. For example, the controller 350 may transmit the speech data SD1 repeatedly with a gap of certain period of time.

In some examples, the transceiver unit 340 may be configured to wirelessly transmit the speech data SD1 to an external device 360 through the communication channel. In some examples, the external device 360 may be the central base station or another two-way radio or a communication network. In some examples, the transceiver unit 340 may include one or more wired or wireless communication interfaces for communication with the external device 360. In some examples, the communication interface may represent one or more networks and/or direct connections.

In some examples, the transceiver unit 340 may communicate with the external device 360 through a communication network. In some examples, the communication network may include one or more of a wireless network, a wired network, a local area network (LAN), a metropolitan area network (MAN), a wide area network (WAN), a wireless personal area network (WPAN), WiMax networks, a direct connection such as through a Universal Serial Bus (USB) port, and/or the like, and may include a set of interconnected networks that make up the Internet. In some examples, the wireless network may include, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc. In some examples, the communication network may include a circuit-switched voice network, a packet-switched data network, or any other network capable for carrying electronic communication. For example, the communication network may include networks based on the Internet protocol (IP) or asynchronous transfer mode (ATM), etc.

Examples of the communication network may further include, but are not limited to, a personal area network (PAN), a storage area network (SAN), a home area network (HAN), a campus area network (CAN), an enterprise private network (EPN), Internet, a global area network (GAN), and so forth. Examples are intended to include or otherwise cover any type of network, including known, related art, and/or later developed technologies to connect the transceiver unit 340 with the external device 360.

In some examples, the PPE system 300 may further include a location device 370 configured to generate a location signal LS1 indicative of the location of the user of the PPE system 300. In some examples, the location device 370 may include a global positioning system (GPS) receiver configured to detect location (positional information) of the user of the PPE system 300. In some examples, the controller 350 may further be configured to receive the location signal LS1 from the location device 370 upon receiving the alert signal AS1 from the safety module 310. In some examples, the controller 350 may be further configured to convert the location of the user into a location speech data LSD1 and transmit the location speech data LSD1 through the transceiver unit 340.

In some examples, the controller 350 may further be configured to merge the location speech data LSD1 with the speech data SD1 corresponding to the user identification UID1. For example, the transceiver unit 340 may combine the speech data SD1 (e.g., the name or the unique identification, etc.) with the location speech data LSD1 (e.g., area, building, etc.) and transmit the combined speech data through the transceiver unit 340.

In some examples, the protection device 301 may be a fall protection harness. The fall protection harness may typically be designed to safely support a person being lifted or lowered as well as to sufficiently distribute fall arrest forces across the user's body, thereby reducing injury from a fall. The fall protection harness may monitor a fall event of the user (e.g., using the motion sensor 314, an acceleration sensor, etc.). In some examples, the fall protection harness may further generate the alert signal AS1 when the fall event may be detected. When the fall event is detected, the PPE system 300 may generate the speech data SD1 corresponding to the user identification UID1 and/or the location speech data LSD1 corresponding to the location of the user, and transmit the speech data SD1 (and/or the location speech data LSD1) through the transceiver unit 340.

Figure 6:
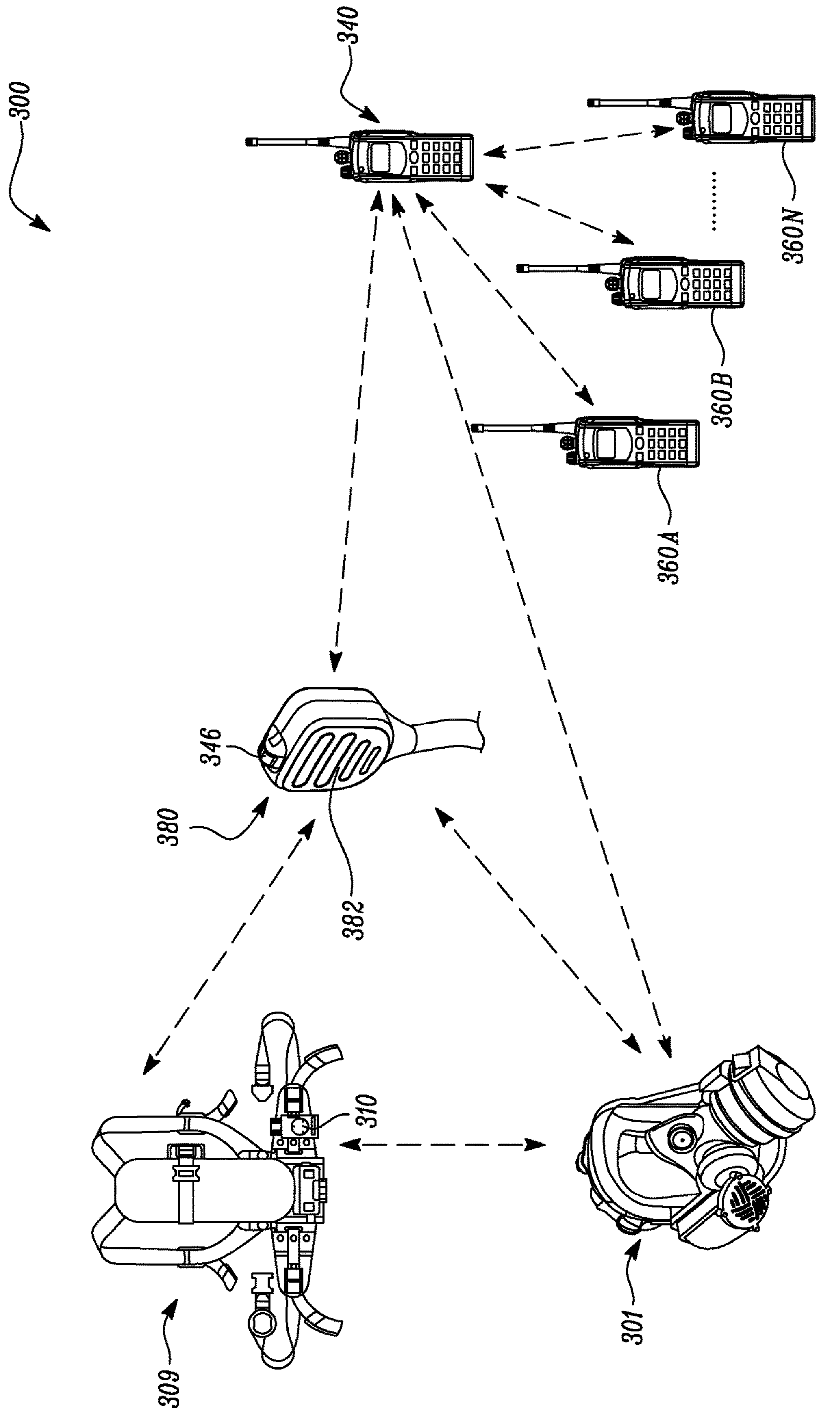
FIG. 6 illustrates a schematic view of an example of the PPE system of FIG. 5, in accordance with techniques of this disclosure.

FIG. 6 is a schematic view of another example of the PPE system 300. Referring now to FIGS. 4-6, the PPE system 300 includes the protection device 301 and the transceiver unit 340. The PPE system 300 may further include a remote speaker microphone (RSM) 380 communicably coupled to the controller 350 and the transceiver unit 340. The RSM 380 may provide remote radio functions, such as speaker and microphone functions. A Push-to-talk (PTT) switch 346 may also be provided on the RSM 380. In some examples, the RSM 380 may include an in-built RSM controller for controlling remote radio functions. The RSM 380 may be wirelessly coupled to the transceiver unit 340 or through a cable (not shown). Further, the RSM 380 may include a speaker grill 382 and a microphone (not shown).

In some examples, the RSM 380 may be configured to receive the speech data SD1 from the controller 350 and transmit the speech data SD1 through the transceiver unit 340. In some examples, the RSM 380 may communicate with the controller 350 via a wireless protocol, such as Bluetooth®, Wi-Fi, ZigBee, infrared, wireless universal serial bus (USB), near-field communication (NFC), RFID protocols, or generally any other RF protocol. Alternatively, or additionally, the RSM 380 may be directly connected to the controller 350 through a data line (not shown). The transceiver unit 340 may wirelessly transmit the speech data SD1 (and/or the location speech data LSD1) to external devices 360A-360N (collectively, the external device 360) through the communication channel. Alternatively, or additionally, the external device 360 may be the central base station.

In some examples, the PPE system 300 may further include a support system 309 coupled to the protection device 301. The support system 309 may be communicably coupled with the protection device 301 and the RSM 380. The PASS 312 of the safety module 310 may alternatively be provided on the support system 309. For example, the protection device 301 may retrieve the user identification UID1 from the memory 302 upon receiving the alert signal AS1 from the PASS 312 disposed on the support system 309. The protection device 301 may further convert the user identification UID1 into the speech data SD1 using the controller 350 and transmit the speech data SD1 directly through the transceiver unit 340. Alternatively, the RSM 380 may receive the speech data SD1 from the protection device 301 to be transmitted through the transceiver unit 340.

In some examples, the controller 350 may be disposed on the support system 309 and converts the user identification UID1 into the speech data SD1. The support system 309 may further communicate the speech data SD1 to the RSM 380 where the RSM 380 may transmit the speech data SD1 through the transceiver unit 340.

Figure 7:
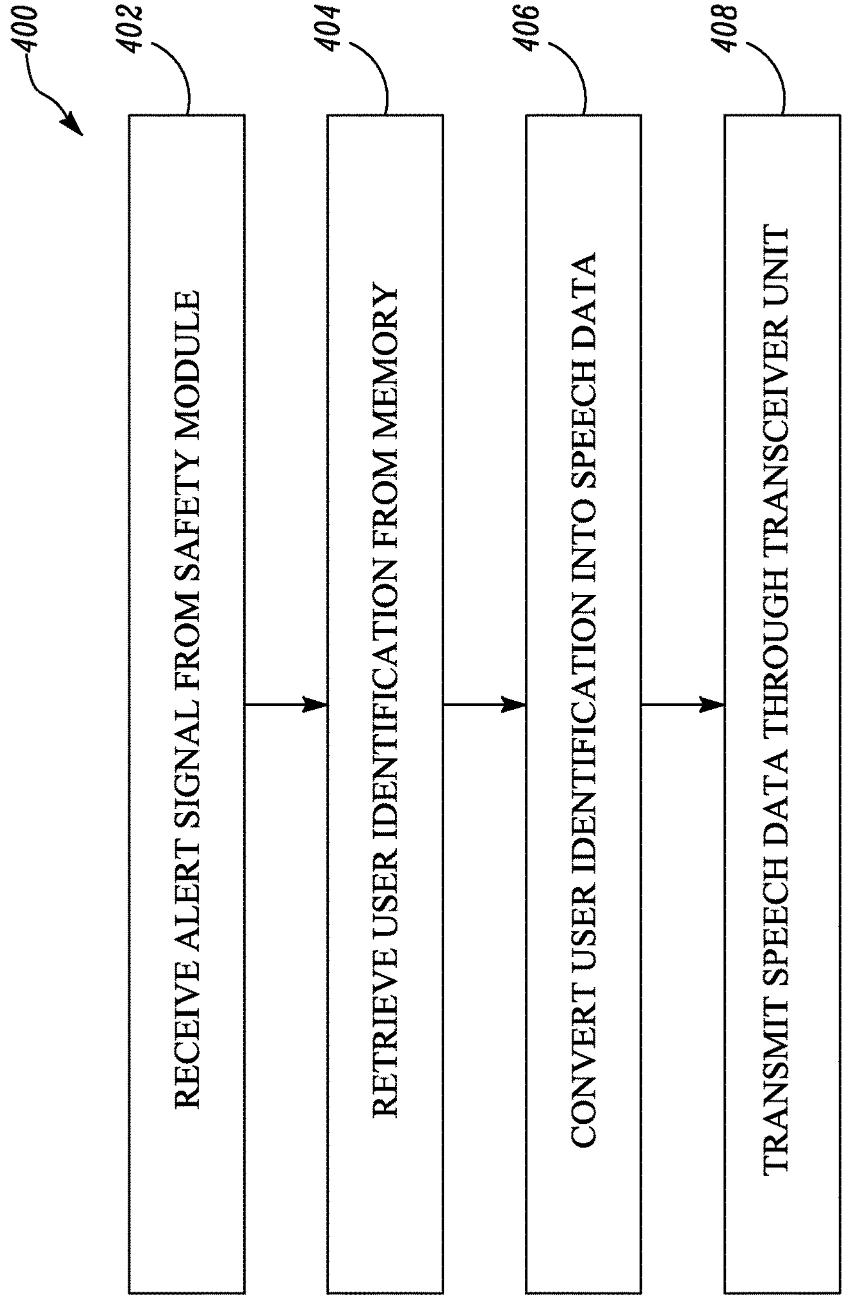
FIG. 7 is a flow chart illustrating a method for use with a personal protective equipment (PPE) article, in accordance with techniques of this disclosure.

FIG. 7 is a flow chart illustrating a method 400 for use with a personal protective equipment (PPE) article. The method 400 may be implemented using the systems 100, 200 of FIGS. 1-3 incorporating the teachings of the present disclosure. In some examples, the PPE article 101 may include at least one of a self-contained breathing apparatus (SCBA), a powered air-purifying respirator (PAPR), a non-powered air purifying respirator (APR) and a full-face respirator.

At step 402, the method 400 includes receiving the alert signal AS from the safety module 210 based the motion status of the user of the PPE article 101. At step 404, the method 400 further includes retrieving, via the controller 250, the user identification UID associated with the user of the PPE article 101 from the memory 202. In some examples, the user identification UID corresponds to at least one of a name and a unique identification associated with the user.

At step 406, the method 400 further includes converting, via the controller 250, the user identification UID into the speech data SD. At step 408, the method 400 further includes transmitting the speech data SD through the transceiver unit 240. The transceiver unit 240 is configured to wirelessly transmit and receive data. In some examples, the transceiver unit 240 may include a land mobile radio (LMR) system. In some examples, the transceiver unit 240 may include the two-way radio 242 that allows transmission of the speech data SD through a communication channel. In some examples, the method 400 may further include activating the PTT switch 244 of the two-way radio 242 before transmitting the speech data SD through the communication channel.

In some examples, transmitting the speech data SD through the transceiver unit 240 may further include transmitting the speech data SD continuously for the predetermined period of time T1. In some examples, transmitting the speech data SD through the transceiver unit 240 may further include transmitting the speech data SD intermittently for the predetermined period of time T2.

In some examples, the method 400 may further include receiving the location signal LS from the location device 270 indicative of the location of the user of the PPE article 101 upon receiving the alert signal AS from the safety module 210. In some examples, the method 400 may further include converting the location of the user into the location speech data LSD and transmitting the location speech data LSD through the transceiver unit 240. In some examples, the method 400 may further include merging the location speech data LSD with the speech data SD corresponding to the user identification UID.

The invention is described and illustrated herein as it may be embodied in a PPE article or a PPE system such as a respiratory protection equipment (e.g., a facepiece, a face shield), a hearing protective device, and/or the type that typically is worn by firefighters and other emergency personnel engaged in similar activities in dangerous, hazardous or potentially hazardous environments. It will be readily appreciated that the teachings of the present disclosure are not limited to use by firefighters and the equipment they use, but is useful and applicable in any situation where communication between the team members facilitates safety and effective work conditions. By way of example and not limitation, the system and method described herein may be used by SWAT team members, HAZMAT workers, and maintenance personnel whose tasks require entry into dangerous environments, such as enclosed tanks, and the like.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized, and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below, or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

The invention claimed is:

1. A system for use with a personal protective equipment (PPE) article, the system comprising:
- a memory configured to store a user identification associated with a user of the PPE article;
- a safety module configured to selectively generate an alert signal based on a motion status of the user of the PPE article;
- a transceiver unit configured to wirelessly transmit and receive data;
- a location device configured to generate a location signal indicative of a location of the user of the PPE article; and
- a controller communicably coupled to the memory, the safety module, the location device, and the transceiver unit, the controller configured to:
  - retrieve the user identification from the memory upon receiving the alert signal from the safety module;
  - convert the user identification into a speech data;
  - transmit the speech data through the transceiver unit;
  - receive the location signal from the location device upon receiving the alert signal from the safety module; and
  - convert the location of the user into a location speech data and transmit the location speech data through the transceiver unit.

2. The system of claim 1, wherein the controller is further configured to convert the user identification into the speech data using a text-to-speech converter.

3. The system of claim 1, wherein the transceiver unit comprises a two-way radio that allows transmission of the speech data through a communication channel.

4. The system of claim 3, wherein the two-way radio comprises a push-to-talk switch such that the two-way radio is configured to wirelessly transmit data upon activation of the push-to-talk switch, and wherein the controller is further configured to activate the push-to-talk switch before transmitting the speech data through the communication channel.

5. The system of claim 1, wherein the controller is further configured to merge the location speech data with the speech data corresponding to the user identification.

6. The system of claim 1, further comprising a remote speaker microphone communicably coupled to the controller and the transceiver unit, the remote speaker microphone configured to receive the speech data from the controller and transmit the speech data through the transceiver unit.

7. The system of claim 1, wherein the transceiver unit is further configured to wirelessly transmit the speech data to an external device through the communication channel.

8. A personal protective equipment (PPE) system, the PPE system comprising:

a memory configured to store a user identification associated with a user of the PPE system;

a safety module configured to selectively generate an alert signal based on a motion status of the user of the PPE system;

a transceiver unit configured to wirelessly transmit and receive data;

a location device configured to generate a location signal indicative of a location of the user of the PPE system; and a protection device comprising a controller communicably coupled to the memory, the safety module, the transceiver unit, and the location device, the controller configured to:

retrieve the user identification from the memory upon receiving the alert signal from the safety module;

convert the user identification into a speech data;

transmit the speech data through the transceiver unit;

receive the location signal from the location device upon receiving the alert signal from the safety module; and convert the location of the user into a location speech data and transmit the location speech data through the transceiver unit.

9. The PPE system of claim 8, wherein the controller is further configured to convert the user identification into the speech data using a text-to-speech converter.

10. The PPE system of claim 8, wherein the transceiver unit comprises a two-way radio that allows transmission of the speech data through a communication channel.

11. The PPE system of claim 10, wherein the two-way radio comprises a push-to-talk switch such that the two-way radio is configured to wirelessly transmit data upon activation of the push-to-talk switch, and wherein the controller is further configured to activate the push-to-talk switch before transmitting the speech data through the communication channel.

12. The PPE system of claim 8, further comprising a remote speaker microphone communicably coupled to the controller and the transceiver unit, the remote speaker microphone configured to receive the speech data from the controller and transmit the speech data through the transceiver unit.

13. The PPE system of claim 8, wherein the transceiver unit is configured to wirelessly transmit the speech data to an external device through a communication channel.

14. A method for use with a personal protective equipment (PPE) article, the method comprising:

receiving an alert signal from a safety module based a motion status of a user of the PPE article;

retrieving, via a controller, a user identification associated with the user of the PPE article from a memory;

converting, via the controller, the user identification into a speech data;

transmitting the speech data through a transceiver unit, wherein the transceiver unit is configured to wirelessly transmit and receive data;

receiving a location signal from a location device indicative of a location of the user of the PPE article upon receiving the alert signal from the safety module; and converting the location of the user into a location speech data and transmitting the location speech data through the transceiver unit.

15. The method of claim 14, wherein the transceiver unit comprises a two-way radio that allows transmission of the speech data through a communication channel.

* * * * *